United States Patent
Bhowmik et al.

(10) Patent No.: US 12,079,109 B2
(45) Date of Patent: Sep. 3, 2024

(54) ENRICHED AUTOMATIC ON-CLOUD INTEGRATED VALIDATIONS FOR CLIENT CUSTOMIZATIONS

(71) Applicant: Schlumberger Technology Corporation, Sugar Land, TX (US)

(72) Inventors: Barnadeep Bhowmik, West Bengal (IN); Akash Bisht, Uttarakhand (IN); Vijay Kumar, Pune (IN); Shreyas Kambli, Pune (IN)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 185 days.

(21) Appl. No.: 17/663,908

(22) Filed: May 18, 2022

(65) Prior Publication Data
US 2023/0376404 A1    Nov. 23, 2023

(51) Int. Cl.
| | |
|---|---|
| *G06F 11/36* | (2006.01) |
| *E21B 49/00* | (2006.01) |
| *G06F 8/65* | (2018.01) |

(52) U.S. Cl.
CPC ........... *G06F 11/3664* (2013.01); *G06F 8/65* (2013.01); *G06F 11/3668* (2013.01); *E21B 49/00* (2013.01)

(58) Field of Classification Search
CPC .... G06F 11/3664; G06F 11/3668; G06F 8/65; E21B 49/00
See application file for complete search history.

(56) References Cited

U.S. PATENT DOCUMENTS

| | | | | |
|---|---|---|---|---|
| 10,114,637 | B1 * | 10/2018 | Willson | G06F 8/71 |
| 2019/0171437 | A1 | 6/2019 | Guda et al. | |
| 2019/0317735 | A1 * | 10/2019 | Duan | G06F 8/34 |
| 2020/0241865 | A1 * | 7/2020 | Phong | G06F 8/71 |
| 2020/0333505 | A1 * | 10/2020 | Yan | G06F 30/27 |

FOREIGN PATENT DOCUMENTS

WO    WO-2016159967 A1 *  10/2016    ......... G06F 17/5009

OTHER PUBLICATIONS

Extended Search Report issued in European Patent Application No. 23174042.4 dated Sep. 29, 2023, 7 pages.

* cited by examiner

*Primary Examiner* — Ziaul A Chowdhury
(74) *Attorney, Agent, or Firm* — Jeffrey D. Frantz

(57) ABSTRACT

Methods, computing systems, and computer-readable storage media are provided for automatic on-cloud integrated validations for client customizations. According to the methods, a first entity provides a hosted environment in a cloud. The hosted environment hosts a pre-release version of software. The hosted environment receives customizations to the pre-release version of the software. The customizations replace one or more submodules of the pre-release version of the software with a customized version of the one or more submodules, or add one or more new submodules to the customized version of the software. The pre-release version of the software is validated, via an automated test procedure, as being compatible with the customizations.

11 Claims, 4 Drawing Sheets

ENRICHED AUTOMATIC ON-CLOUD INTEGRATED VALIDATIONS FOR CLIENT CUSTOMIZATIONS

BACKGROUND

Commercialization of software is often a complex and hard to achieve objective due to current limitations and an inability to pre-validate new software in a customer's environment. In the energy industry, most companies purchase popular software from vendors and customize the software for their own workflows before making it available to their employees.

It can be challenging for a software development company and an end-user company to synchronize their work and to make sure that upgrades from the software development company can be rolled out effortlessly to all customers. Moreover, it is difficult for the software development company to ensure that the new application rollout integrates with customizations specific to or even implemented separately by the end-user companies. Today, there are often expensive and lengthy periods of time in which manpower is allocated to customize the software of the software development company to tailor it for customers, prior to rollout. Often, this difficulty leads to delays in acceptance of new and improved features from the software development company.

SUMMARY

Embodiments of the disclosure may provide a method for automatic on-cloud integrated validations for client customizations. According to the method, a first entity provides a hosted environment in a cloud. The hosted environment hosts a pre-release version of software. The hosted environment receives customizations to the pre-release version of the software. The customizations replace one or more submodules of the pre-release version of the software with a customized version of the one or more submodules, or adds one or more new submodules to the customized version of the software. The pre-release version of the software is validated, via an automated test procedure, to determine whether it is compatible with the customizations.

In an embodiment, the validating may include determining whether the customizations function as intended with the pre-release version of the software without breaking any features of the pre-release version of the software.

In an embodiment, the receiving of the customizations to the pre-release version of the software includes receiving a call via an application program interface to replace the one or more submodules of the pre-release version of the software with the customized version of the one or more submodules.

In an embodiment, a subscription to the hosted environment provides a second entity with access to the pre-release version of the software.

In an embodiment, the subscription allows only the second entity to provide the customizations to the pre-release version of the software in the hosted environment.

In an embodiment, the subscription allows two or more second entities to share access to the pre-release version of the software with the customizations.

In an embodiment, the subscription provides the second entity with private access to the pre-release version of the software with the customizations.

Embodiments of the disclosure may also provide a computer system for automatic on-cloud integrated validations for client customizations. The computer system resides in a cloud and includes at least one processor, and a memory having instructions stored therein for the computer system to perform operations. According to the operations, a hosted environment of a first entity is provided in a cloud. The hosted environment hosts a pre-release version of software. The hosted environment receives customizations to the pre-release version of the software, wherein the customizations replace one or more submodules of the pre-release version of the software with a customized version of the one or more submodules, or adds one or more new submodules to the customized version of the software. Whether the pre-release version of the software is compatible with the customizations is validated via an automated test procedure.

Embodiments of the disclosure may further provide a non-transitory computer-readable storage medium having instructions stored thereon. When executed by a computing device, the instructions cause the computing device to perform operations. According to the operations, a hosted environment of a first entity is provided in a cloud. The hosted environment hosts a pre-release version of software. The hosted environment receives customizations to the pre-release version of the software. The customizations replace one or more submodules of the pre-release version of the software with a customized version of the one or more submodules, or adds one or more new submodules to the customized version of the software. Whether the pre-release version of the software is compatible with the customizations is validated via an automated test procedure.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
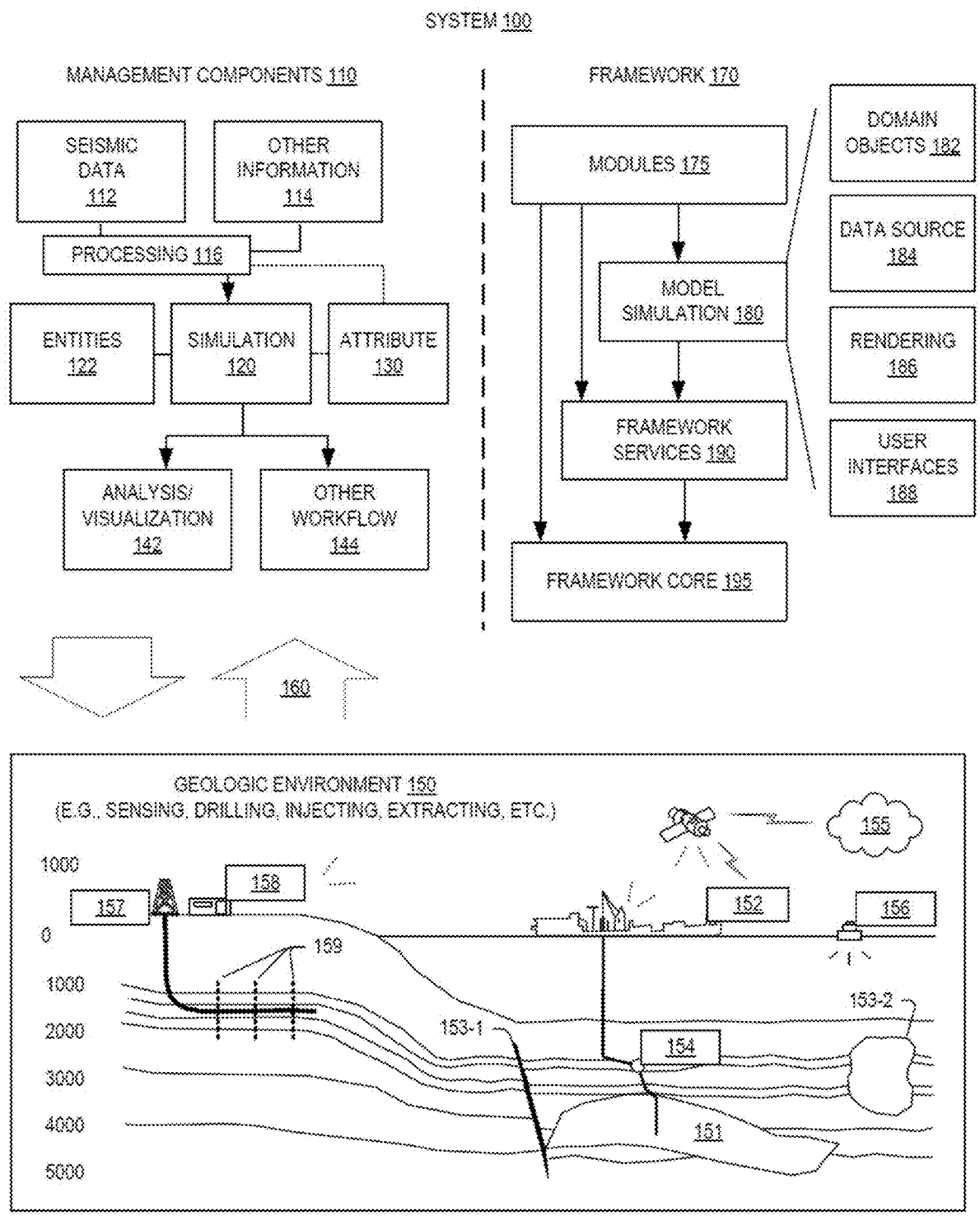
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
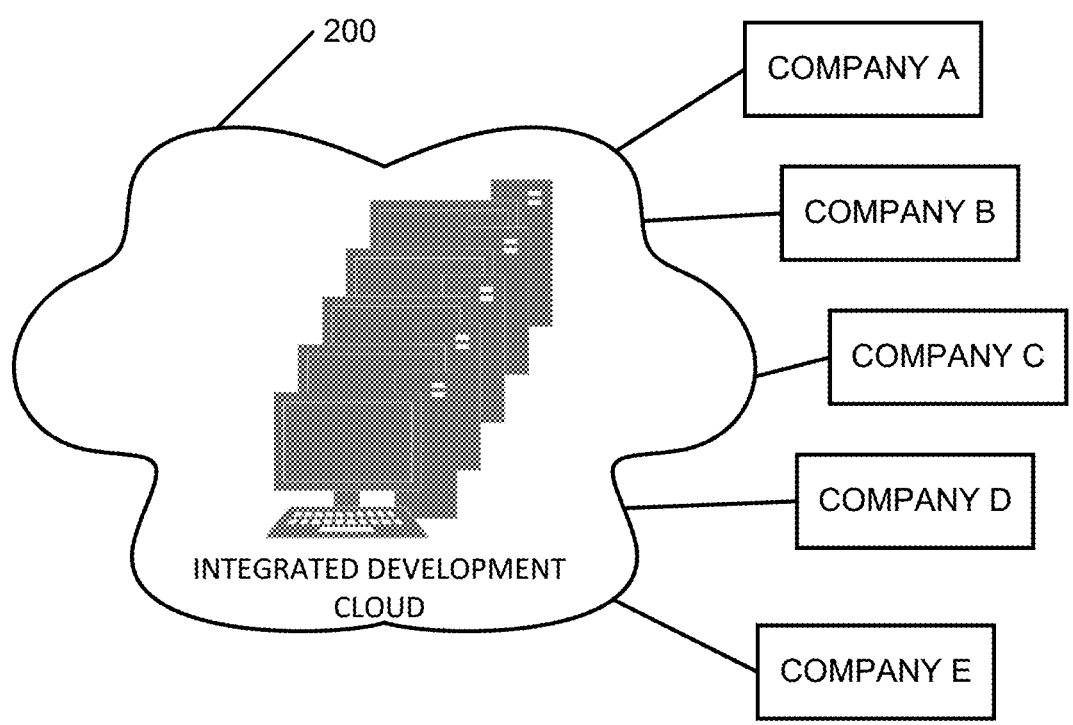
FIG. 2 illustrates an example integrated development cloud having multiple hosted environments, each of which is for a respective entity or company to customize.

FIG. 2 illustrates a schematic view of an integrated development cloud 200, according to an embodiment. Integrated development cloud 200 may be owned and managed by a software development company and may be a preconfigured cloud environment that provides virtual machines on demand. As shown, integrated development cloud 200 may include five hosted environments (e.g., virtual machines), which may be collocated or may be spread across a number of sites at various geographic locations. The five individual hosted environments may have a pre-release version of software from a first entity, such as a software development company, which may be customized by a respective second entity or company. The software may be any software that an entity may want to customize for their own purposes. One example of such software may include PETREL®, which is provided by Schlumberger Limited of Houston, Texas. For example, a first hosted environment may be customized by company A, a second hosted environment may be customized by company B, a third hosted environment may be customized by company C, a fourth hosted environment may be customized by company D, and a fifth hosted environment may be customized by company E. In the arrangement shown in FIG. 2, the companies may have private access to their respective hosted environment. In other embodiments, some of the companies may have shared access to their respective hosted environment with one or more other companies. Each company may have access to a respective hosted environment via a subscription service.

In other embodiments, the integrated development cloud 200 may have fewer or more hosted environments than as shown in FIG. 2. Further, more or fewer second entities or companies may have access to respective hosted environments in other embodiments.

Integrated development cloud 200 is a scalable framework for integrating client owned customizations in development and validation processes of a software development company while protecting the clients' intellectual property. Clients, or customers, may subscribe to an integrated on-cloud platform of integrated development cloud 200 to ensure the automated validations are run for every new software upgrade on which the software development company works.

With this new framework, using a simple set of automated application program interfaces (APIs), customers can "plug-in" their automated tests to the development pipelines of software development companies. In other words, customers can run automated tests via calls to specific automated test APIs.

Figure 3:
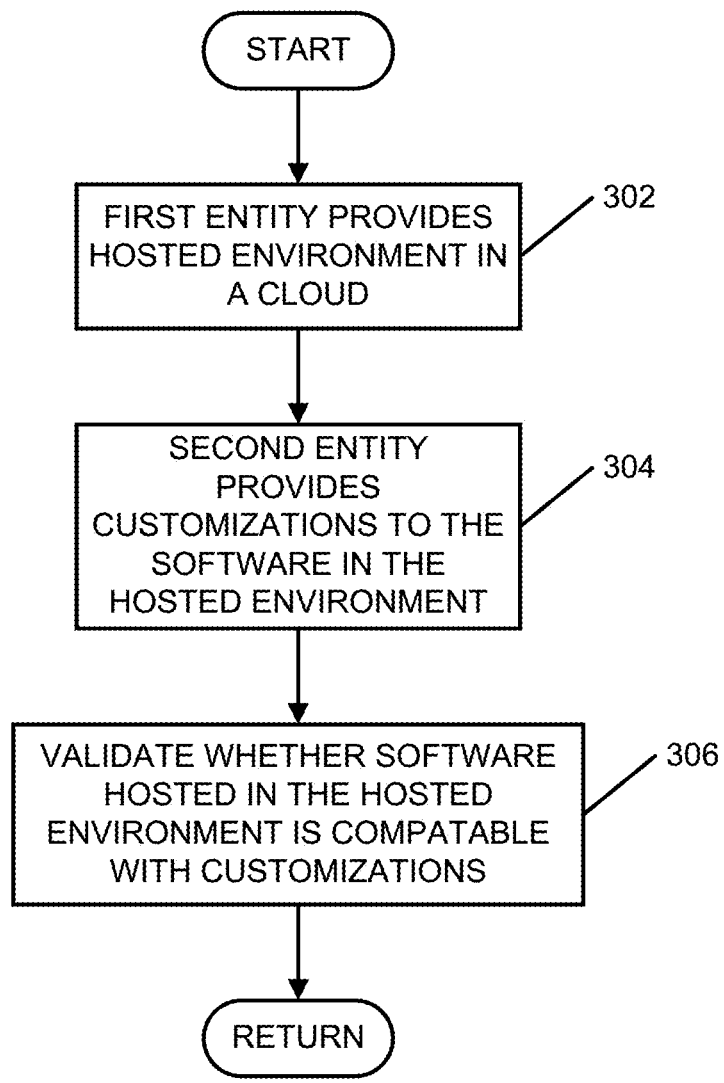
FIG. 3 shows an example workflow that may be performed in various embodiments for providing a hosted environment in a cloud, receiving customizations to the software in the hosted environment from a second entity, and validating whether the software in the hosted environment is compatible with the customizations.

FIG. 3 shows a flowchart of a workflow, according to one embodiment. The workflow begins with a first entity, such as a software development company, providing a hosted environment with a pre-release version of its software in a cloud (act 302). A second entity may provide customizations to one or more submodules of the pre-release version of the software.

A software module includes one or more submodules for implementing one aspect of an application. A software submodule may be one or more subroutines included in a software module.

The customizations may be made by a call to an API to replace one or more submodules with corresponding customized submodules (act 304). The call to the API may include parameters such as a location and a name of one or more customized submodules, and a location and a name of one or more submodules to be replaced. One or more new submodules may be added by calling the API or a second API along with parameters that provide a name and location of the one or more new submodules.

As a result of the call, the one or more customized submodules may be compiled and linked with submodules of the pre-release version of the software such that the one or more customized submodules replace the one or more submodules of the pre-release version of the software. The pre-release version of the software with the one or more customized modules may be validated as being compatible by running automated tests (act 306). The automated tests may be executed by making a call through one or more specific APIs to cause the automated tests to be executed.

Embodiments are not specific to any particular industry, but instead, may be used in any industry in which multiple collaborators work together on a software solution to one or more problems. However, each collaborator may have a different process for handling the one or more problems.

In a petroleum industry example, an energy company develops software (X) to identify a geomorphology in an area. The software (X) provides general insights. Company A uses X and adds a "customized plug-in" to run additional calculations on subsurface permeability. Company B uses X and adds a "customized plug-in" to run additional calculations on subsurface porosity. The "customized plug-ins" may be added by calling an API indicating a name and location of the customized plug-in software to be added.

In a semiconductor industry example, a semiconductor company develops a new chip, XA001. After market release of the chip, a smartphone company, A, executes their operating system on the chip with modifications to maximize performance of the chip XA001. Another smartphone company, company B runs their operating system on the chip. Using various embodiments, the semiconductor company can provide an integrated cloud environment on which company A and company B can run their operating systems and use tools such as, for example, Verilog, which is a hardware description language, to identify compatibility issues and fix them much earlier, during a pre-release stage. In this example, the hosted cloud environment is a virtual device using chip XA001 in any data center in the world. The virtual device may be preinstalled with tools such as Verilog. Company A and company B call APIs to connect to the virtual device, install their particular operating systems, and run specific software tests to identify issues.

Figure 4:
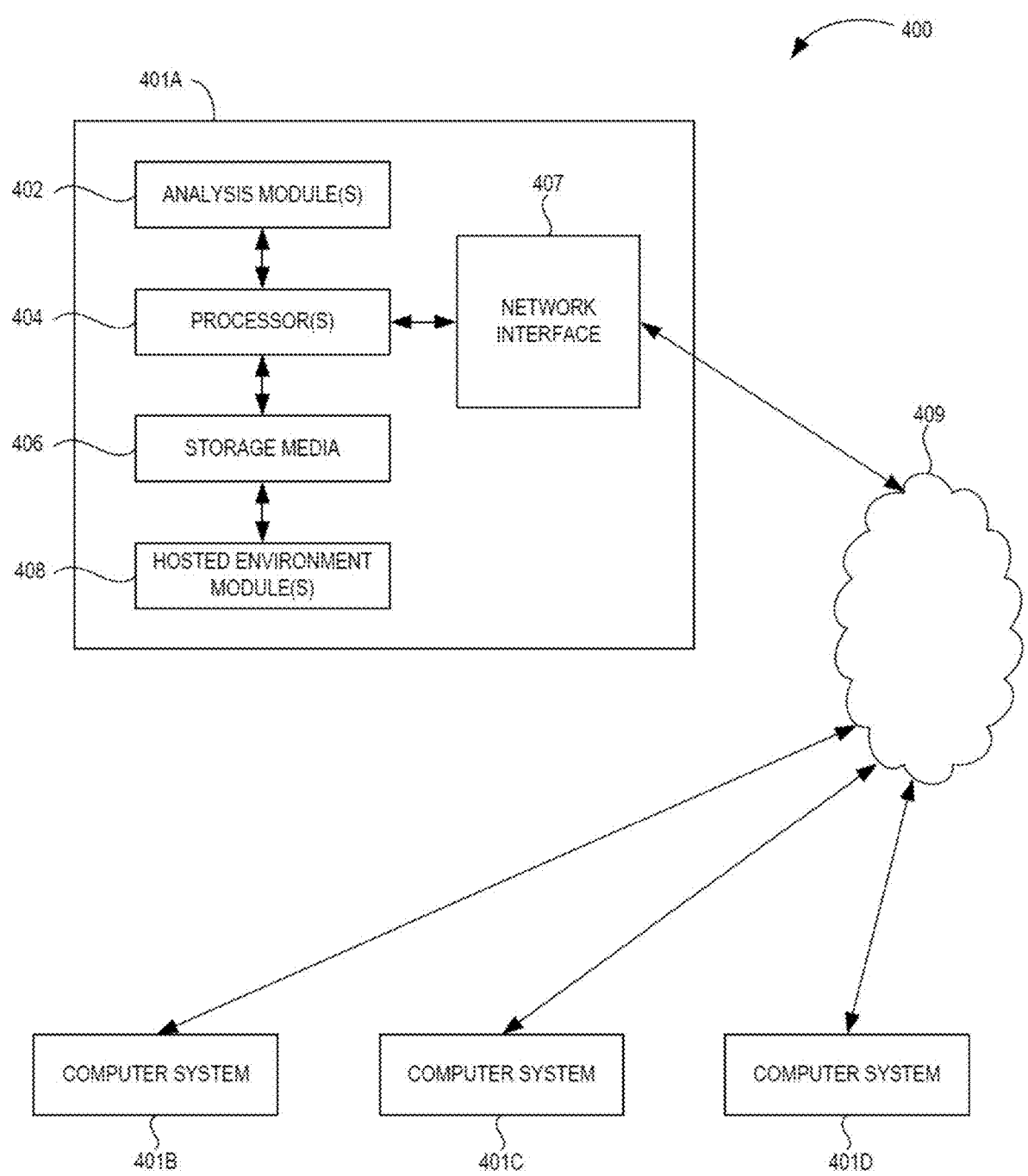
FIG. 4 illustrates a schematic view of a computing system, according to an embodiment.

The methods of the present disclosure may be executed by a computing system, which may be in a cloud computing environment. FIG. 4 illustrates an example of such a computing system 400, in accordance with some embodiments. The computing system 400 may include a computer or computer system 401A, which may be an individual computer system 401A or an arrangement of distributed computer systems. The computer system 401A includes one or more analysis modules 402 that are configured to perform various tasks according to some embodiments, such as one or more methods disclosed herein. To perform these various tasks, the analysis module 402 executes independently, or in coordination with, one or more processors 404, which is (or are) connected to one or more storage media 406. The processor(s) 404 is (or are) also connected to a network interface 407 to allow the computer system 401A to communicate over a data network 409 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be located in a processing facility, while in communication with one or more computer systems such as 401C and/or 401D that are located in one or more data centers, and/or located in varying countries on different continents).

A processor may include a microprocessor, microcontroller, processor module or subsystem, programmable integrated circuit, programmable gate array, or another control or computing device.

The storage media 406 may be implemented as one or more computer-readable or machine-readable storage media. Note that while in the example embodiment of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 400 contains one or more hosted environment modules 408. In the example of computing system 400, computer system 401A includes the hosted environment module 408. In some embodiments, a single hosted environment module may be used to perform some aspects of one or more embodiments of the methods disclosed herein. In other embodiments, a plurality of hosted environment modules may be used to perform some aspects of methods herein.

It should be appreciated that computing system 400 is merely one example of a computing system, and that computing system 400 may have more or fewer components than shown, may combine additional components not depicted in the example embodiment of FIG. 4, and/or computing system 400 may have a different configuration or arrangement of the components depicted in FIG. 4. The various components shown in FIG. 4 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 400, FIG. 4), and/or through manual control by a user who may make determinations regarding whether a given step, action, template, model, or set of curves has become sufficiently accurate for the evaluation of the subsurface of a three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

The above described embodiments have a number of advantages over existing methods of customizing software. In existing methods, clients start working on customizations after commercial release of a new software product. If there are changes that break the software, it is difficult to ask the software development company to make modifications. Often, these post-release modifications take quite a bit of time. For example, it could take approximately nine months for the software development company to develop and test new software before releasing the new software. A client company receiving the released software may spend approximately four months developing customizations and testing and deploying the customized software for company use.

In the various embodiments of this disclosure, the software development company and the client company may develop and test the software in parallel. For example, while the software development company is continuing to develop and test their software, a client company may develop their customizations and test the customizations in parallel with the work performed by the software development company. As a result, when the software development company releases the software, because of the work already performed by the customer company, a much shorter period of time would exist between the release of the software by the software development company and deployment of the customized software by the client company.

What is claimed is:

1. A method for automatic on-cloud integrated validations for client customizations, the method comprising:
   providing, by a first entity, a hosted environment in a cloud, the hosted environment hosting a pre-release version of software for using information pertaining to a geologic formation in performing subsurface operations, wherein a subscription to the hosted environment provides a second entity with access to the pre-release version of the software;
   receiving, by the hosted environment, customizations to the pre-release version of the software, the customizations replacing one or more submodules of the pre-release version of the software with a customized version of the one or more submodules, or adding one or more new submodules to the customized version of the software, wherein the one or more submodules or the one or more new submodules are configured to determine subsurface conditions of the geologic formation for use in performing the subsurface operations, wherein the receiving of the customizations to the pre-release version of the software comprises receiving a call via an application program interface to replace the one or more submodules of the pre-release version of the software with the customized version of the one or more submodules; and
   validating, via an automated test procedure, whether the pre-release version of the software is compatible with the customizations, wherein the validating comprises determining whether the customizations function as intended with the pre-release version of the software without breaking any features of the pre-release version of the software.

2. The method of claim 1, wherein the subscription allows only the second entity to provide the customizations to the pre-release version of the software in the hosted environment.

3. The method of claim 1, wherein the subscription allows two or more second entities to share access to the pre-release version of the software with the customizations.

4. The method of claim 1, wherein the subscription provides the second entity with private access to the pre-release version of the software with the customizations.

5. A computer system for automatic on-cloud integrated validations for client customizations, the computer system residing in a cloud and comprising:
 at least one processor;
 a memory having instructions stored therein for the computer system to perform a plurality of operations, the plurality of operations comprising:
  providing a hosted environment of a first entity in a cloud, the hosted environment hosting a pre-release version of software for using information pertaining to a geologic formation in performing subsurface operations, wherein a subscription to the hosted environment provides a second entity with access to the pre-release version of the software;
  receiving, by the hosted environment, customizations to the pre-release version of the software, the customizations replacing one or more submodules of the pre-release version of the software with a customized version of the one or more submodules, or adding one or more new submodules to the customized version of the software, wherein the one or more submodules or the one or more new submodules are configured to determine subsurface conditions of the geologic formation for use in performing the subsurface operations, wherein the receiving of the customizations to the pre-release version of the software comprises receiving a call via an application program interface to replace the one or more submodules of the pre-release version of the software with the customized version of the one or more submodules; and
  validating, via an automated test procedure, whether the pre-release version of the software is compatible with the customizations, wherein the validating comprises determining whether the customizations function as intended with the pre-release version of the software without breaking any features of the pre-release version of the software.

6. The computer system of claim 5, wherein the subscription allows only the second entity to provide the customizations to the pre-release version of the software in the hosted environment.

7. The computer system of claim 5, wherein the subscription allows two or more second entities to share access to the pre-release version of the software with the customizations.

8. The computer system of claim 5, wherein the subscription provides the second entity with private access to the pre-release version of the software with the customizations.

9. A non-transitory computer-readable storage medium having instructions stored thereon, when executed by a computing device, the instructions cause the computing device to perform a plurality of operations, the plurality of operations comprising:
 providing a hosted environment of a first entity in a cloud, the hosted environment hosting a pre-release version of software for using information pertaining to a geologic formation in performing subsurface operations, wherein a subscription to the hosted environment provides a second entity with access to the pre-release version of the software;
 receiving, by the hosted environment, customizations to the pre-release version of the software, the customizations replacing one or more submodules of the pre-release version of the software with customized versions of the one or more submodules, or adding one or more new submodules to the customized version of the software, wherein the one or more submodules or the one or more new submodules are configured to determine subsurface conditions of the geologic formation for use in performing the subsurface operations, wherein the receiving of the customizations to the pre-release version of the software comprises receiving a call via an application program interface to replace the one or more submodules of the pre-release version of the software with the customized version of the one or more submodules; and
 validating, via an automated test procedure, whether the pre-release version of the software is compatible with the customizations, wherein the validating comprises determining whether the customizations function as intended with the pre-release version of the software without breaking any features of the pre-release version of the software.

10. The non-transitory computer-readable storage medium of claim 9, wherein the subscription allows two or more second entities to share access to the pre-release version of the software with the customizations.

11. The non-transitory computer-readable storage medium of claim 9, wherein the subscription provides the second entity with private access to the pre-release version of the software with the customizations.

* * * * *